US011443375B1

(12) United States Patent
Vadaparty et al.

(10) Patent No.: US 11,443,375 B1
(45) Date of Patent: *Sep. 13, 2022

(54) META DATA DRIVEN STATE TRANSITION ENGINE FOR ORDER MANAGEMENT SYSTEM

(71) Applicant: Morgan Stanley Services Group Inc., New York, NY (US)

(72) Inventors: Kumar Vadaparty, Belle Mead, NJ (US); Vishal Agrawal, Montville, NJ (US); Bhupen Kinariwala, New York, NY (US); Arun Maroli, Edison, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,468

(22) Filed: Nov. 19, 2019

Related U.S. Application Data (63) Continuation of application No. 16/272,362, filed on Feb. 11, 2019.

(51) Int. Cl.
*G06Q 40/04* (2012.01)
*G06Q 30/06* (2012.01)

(52) U.S. Cl.
CPC ......... *G06Q 40/04* (2013.01); *G06Q 30/0637* (2013.01)

(58) Field of Classification Search
CPC ........ G06Q 40/00; G06Q 40/02; G06Q 40/04; G06Q 40/06; G06Q 40/08; G06Q 40/025; G06Q 20/10; G06Q 30/08
See application file for complete search history.

(56) References Cited

U.S. PATENT DOCUMENTS

| 7,313,267 | B2 | 12/2007 | Call et al. |
|---|---|---|---|
| 7,877,727 | B2 | 1/2011 | Sharp et al. |
| 9,405,758 | B2 | 8/2016 | Ruan et al. |
| 2005/0021594 | A1 | 1/2005 | Bernardin et al. |
| 2005/0137960 | A1* | 6/2005 | Brann ............... G06Q 40/04 705/37 |

(Continued)

OTHER PUBLICATIONS (JBoss Drools Team, "Drools Introduction and General User Guide", May 12, 2012).*

(Continued)

*Primary Examiner* — Gregory A Pollock
(74) *Attorney, Agent, or Firm* — K&L Gates LLP (57) ABSTRACT

An order management system comprises a middle tier and a computer-based automatic rule code generation system. The middle tier comprises a state transition engine that manages rule-based state transitions of trade orders for financial products from one state to a next state in progressions of the trade orders. The computer-based automatic rule code generation system: (i) receives a human-readable state transition file that specifies one or more state transition rules and a corresponding condition for each of the one or more state transition rules; and (ii) generates, at compile time, a configuration file that comprises rule code for the one or more state transition rules from the state transition file. The state transition engine runs the rule code in the configuration file at runtime to manage the state transitions for the trade orders.

10 Claims, 4 Drawing Sheets

(56) References Cited

U.S. PATENT DOCUMENTS

| | | | |
|---|---|---|---|
| 2007/0245040 A1 | 10/2007 | Acsadi | |
| 2008/0177872 A1 | 7/2008 | Vengroff | |
| 2008/0301079 A1* | 12/2008 | Proctor | G06N 5/022 |
| | | | 706/47 |
| 2014/0257935 A1* | 9/2014 | Killoh | G06Q 30/0283 |
| | | | 705/7.35 |
| 2018/0089601 A1 | 3/2018 | Link et al. | |
| 2019/0066214 A1* | 2/2019 | Teixeira | G06Q 40/06 |

OTHER PUBLICATIONS

Hopkins ("Representing and Editing JSON with Spreadsheets", Jun. 23, 2018).*

* cited by examiner fig. 1

| | A | B | C | D | E |
|---|---|---|---|---|---|
| 1 | Entity | Field Name | Type | Field Data Type | Description |
| 2 | | | list-of-Order | | |
| 3 | | | | | |
| 4 | | | list-of-String | enum | |
| 5 | | | | | |
| 6 | | | | | |
| 7 | | | map-of-activity | | |
| 8 | | | | | |
| 9 | | | | | |

META DATA DRIVEN STATE TRANSITION ENGINE FOR ORDER MANAGEMENT SYSTEM

PRIORITY CLAIM

The present application is a continuation application under 35 U.S.C. § 120 of U.S. application Ser. No. 16/272,362, filed Feb. 11, 2019, which is incorporated herein by reference.

BACKGROUND

An order management system is a computer system that executes financial security trade orders in an efficient and cost-effective manner. Brokers and dealers use order management systems when filling orders for various types of securities and are able to track the progress of each order through its various states, such as pre-approval (if approval is needed for some reason), open, filled, canceled, confirmed, etc. State transitions for an order management system are typically computed based on specific business logic. This business logic typically varies based on the particular asset class involved, such as equity, mutual funds, fixed income. This business logic is typically programmed into code leading to product-specific code bases in vertical, product-specific implementations, which are often complex and costly to implement and maintain.

SUMMARY

In one general aspect, the present invention is directed to an efficient, reusable, extensible light weight framework for computing, for example, order state transitions for an asset class-agnostic order management system. The state transition logic is specified in meta-data configuration files separate from the state machine itself, which provides the benefit of externalize the state transition business logic from the main engine code base. In particular, the state transition logic is specified in the form of configuration files which are automatically generated from a human readable document containing an easy to read representation of the business logic.

Separating the business logic from state machine code helps reduce the implementation and maintenance cost of the application. It also helps reduce the effort required to perform the testing function to validate the business logic. The human readable document can enable system stakeholders to easily modify the business logic. The present invention can, thereby, also ensure a high degree of fidelity between the document itself and how the system is behaving at any given time in the production environment.

These and other benefits of the present invention will be apparent from the description that follows.

FIGURES

Various embodiments of the present invention are described herein by way of example in connection with the following figures, wherein.

DESCRIPTION

Figure 1:
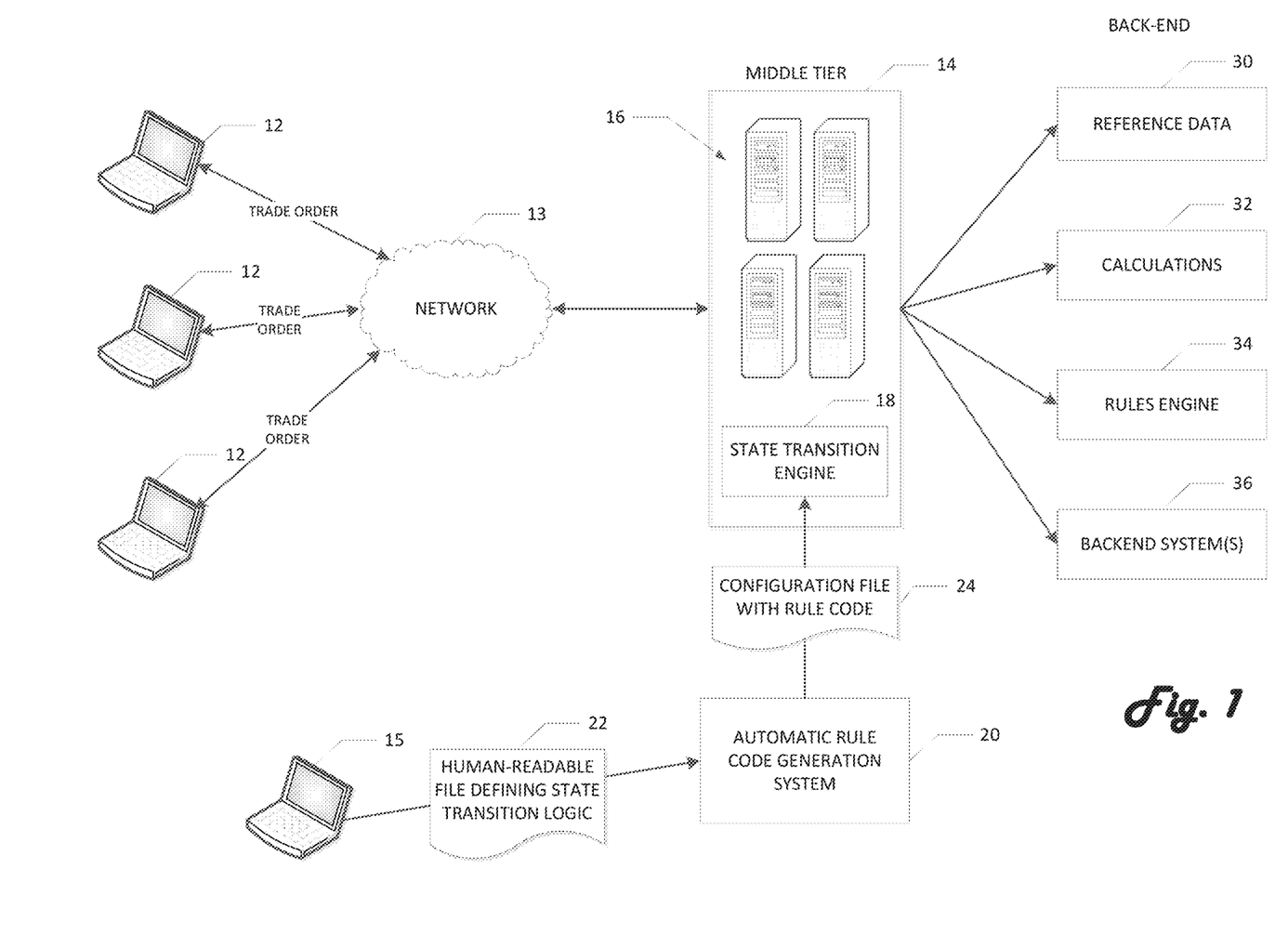
FIG. 1 is a diagram of an order management system according to various embodiments of the present invention.

FIG. 1 illustrates aspects of an order management system according to various embodiments of the present invention. Users, at computer devices 12, submit trade orders for financial securities to a middle tier 14 via a data network 13. The middle tier 14 may be implemented with servers 16, which may include and execute a state transition engine 18. The state transition engine 18 preferably is a Java-based rules engine that handles the transitions of trade orders from one state to the next in the progression of the trade order. In that connection, the state transition engine 18 is a software system, that when executed by the processors of the middle tier servers 16, executes state transition business rules for the order management system in a runtime production environment. It essentially handles the "order book" for the trades, recording the details of the order and its current status. As mentioned above, common states for trade orders include pre-approval (if approval is needed for some reason), open, filled, partially filled, canceled, confirmed, rejected, booked, etc. The applicable states for trade orders typically vary somewhat based on the type of security involved, such as stocks, mutual funds, bonds or fixed income securities, derivatives, foreign exchange, etc. The transitions from one state to another are governed by one or more conditions. For example, if the conditions for the transition from State A (e.g., open) to State B (e.g., filled) for a particular trade order are satisfied, the state transition engine 18 transitions the trade from State A to State B in the order book. Often, the middle tier servers 16 need to place back-end calls to determine whether the conditions for state transition are met. In such a context, the back-end systems may comprise reference data systems 30, calculation engines 32, rules engines 34 and other back-end systems 36. In various embodiments, the state transition engine 18 uses dRools, an open-source based rules engine.

The data network 13 may be the Internet, a LAN, a WAN, etc. The back-end systems 30-36 may be implemented with suitable computer systems, such as database management systems, servers, mainframes, etc.

In various embodiments, the present invention utilizes a computer-based, automatic rule code generation system 20 that converts a human-readable file 22, which defines the conditions required to state transitions for one or more security types ("state transition file 22"), into a configuration file 24 with rule code (i.e., computer code for state transition rules) for the state transition engine 18 to run at compile time. In various embodiments, the configuration file 24 comprises rules that are written in Java code, particularly where the state transition engine 18 uses dRools. Such rules for dRools are often referred to as "DRLs." The middle tier engine 18 then executes the rule code in the configuration file 24 at runtime to implement the logic of the state transitions.

Figure 2:
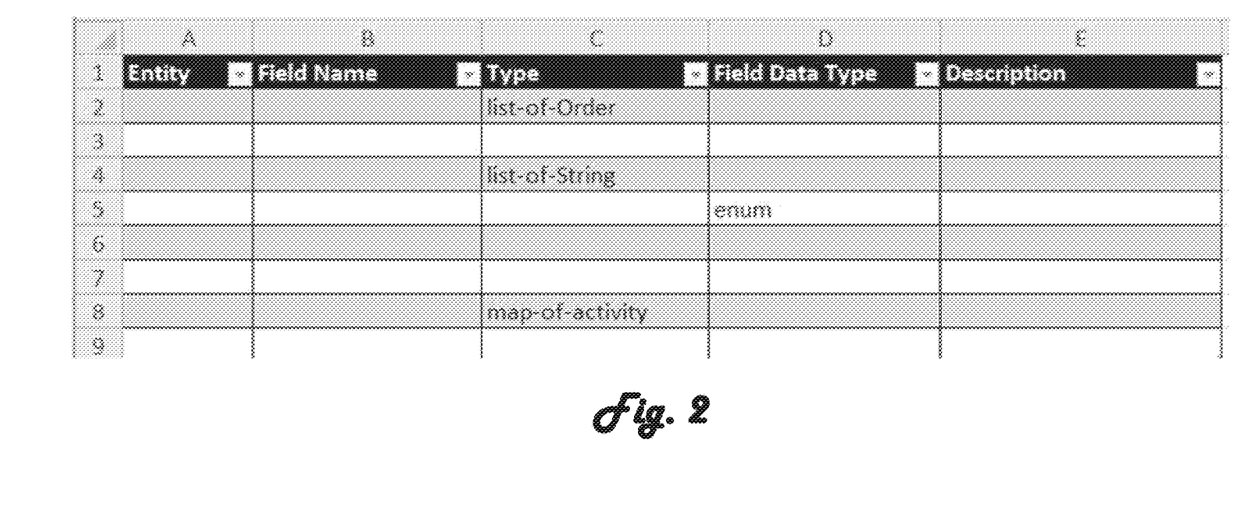
FIG. 2 depicts a sample data model sheet of the human readable file of FIG. 1 according to various embodiments of the present invention.

In operation, according to various embodiments, a "programmer" at a computer device 15 may specify, in the state transition file 22, the rule parameters and criteria for state transitions for one or more types of trade orders, which transition logic file may be uploaded, transmitted or otherwise stored on the automatic rule code generation system 20. In various embodiments, the state transition file 22 includes a spreadsheet file, although other suitable human readable file types could be used to specify the transition logic. In various embodiments, the spreadsheet file includes a data model sheet and a rules sheet. The data model sheet, as example of which is shown in FIG. 2, defines entity attribute relationships. In various embodiments, it includes "entity," "field name," "type" and "field-data-type" columns. The "entity" column identifies the data models which hold attributes. The "field name" column identifies, for each entity listed in the "entity" column, the properties of the entity. The "type" column identifies the data type for the attribute and the "field-data-type" column identifies the type of attribute. The "type" could be a collection type of a particular entity. For example, possible entities could be order and activity. In that case, a possible "type" could be list-of-order or map-of-activity. Possible entries in the "field-data-type" column include, for example, "enumerated" (or "enum") where the attribute is an enumerated type; otherwise the "field-data-type" entry for an attribute may be "class" or some other entry to differentiate enumerated. The data model sheet could comprise additional and/or different columns in other embodiments, such as a textual description of each entity.

Figure 3:
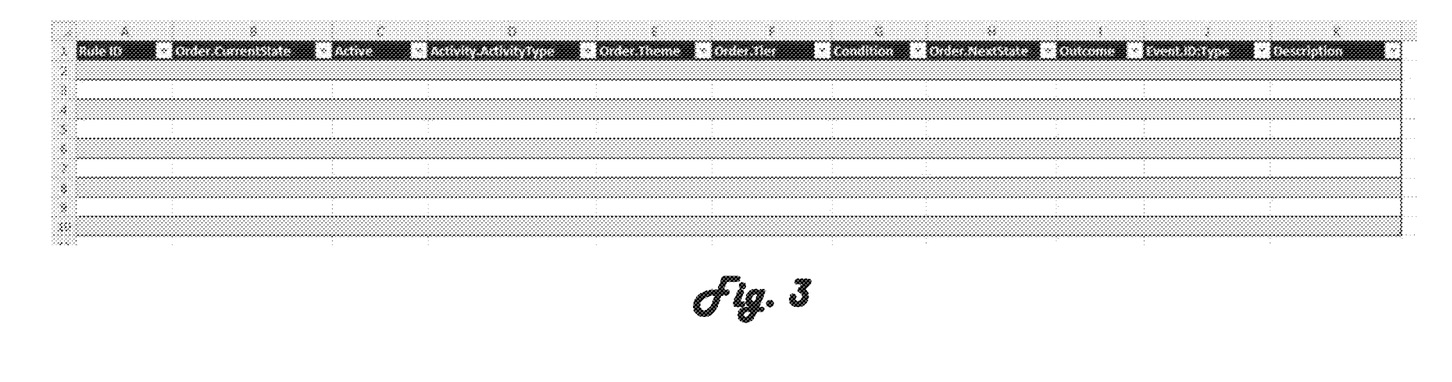
FIG. 3 depicts a sample rules sheet of the human readable file of FIG. 1 according to various embodiments of the present invention.

The rules sheet, in various embodiments, defines the rule criteria based on which the drl is generated. The sheet also defines the outcome for the rule. It may also define additional criteria along with the predicate, in order to process the request and generate the outcome. In various embodiments, the rules sheet, as shown in the example of FIG. 3, include the following columns: a Rule ID column that specifies a unique rule ID for each rule; an Order.CurrentState column that specifies a current state of an order to which the rule in the Rule ID column applies; an Active column that indicates whether the rule is activated or deactivated; an Activity Type column that specifies a type of activity performed on a trade order for the specified rule in the Rule ID column; an Order Theme column that indicates the type of order; an Order Tier column that indicates an order tier for the order; a Condition field written in a grammar syntax that specifies the condition(s) under which the rule applies; an Order Next State column that specifies the next state of the order when the condition(s) (specified in the Condition field) are met; an Outcome field that specifies whether the next state is modified, skipped or an error; and an Event ID Type field that specifies an event(s) to be triggered after the rule is processed. For example, in addition to moving from the current state to the next state for a trade in the order management system, if the Event ID Type is triggered when the rule is executed by the order management engine, an additional event is triggered, such as a notification sent by the middle tier to the calling system (e.g., the system that placed the call to the middle tier). The notification may be, for example, that the move to the next state has occurred or some other type of event or notification. The Event ID Type notifications could be blank or include one or more values that may be used by the recipient (e.g., calling) system.

The rules sheet could comprise additional and/or different columns in other embodiments, such as a textual description of each rule.

Figure 4:
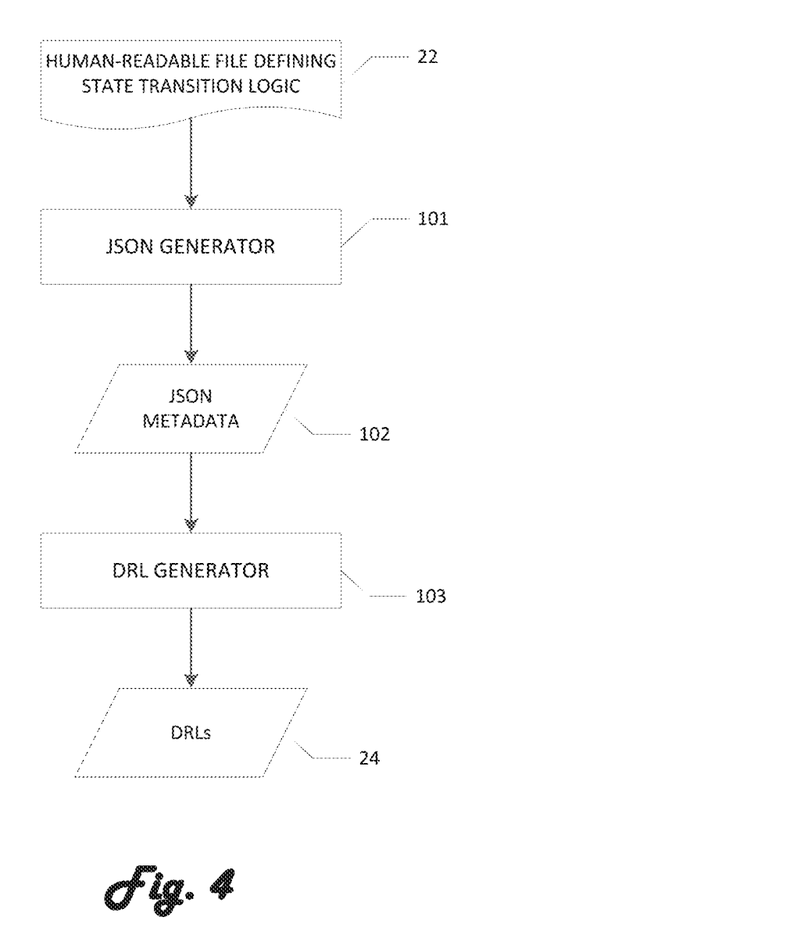
FIG. 4 is a flow chart depicting a process performed by the order management system of FIG. 1 according to various embodiments of the present invention.

FIG. 4 is a diagram of a process executed by the automatic rule code generation system 20 according to various embodiments. At the outset, the automatic rule code generation system 20 receives the human-readable state transition file 22 (see, e.g., FIGS. 2-3), such as from the programmer 15 shown in FIG. 1 via a data network, for example. The state transition file 22, as explained above, defines the rule parameters and criteria for the state changes for the order management system. The automatic rule code generation system 20 may include a JSON (JavaScript Object Notation) generator component 101, which generates JSON metadata 102 from the state transition file 22. The JSON generator component 101 preferably applies validations, row by row of the rules sheet (see FIG. 3) of the state transition file 22, to generate the JSON metadata 102. Below is a template for the JSON metadata 102 generated by the JSON generator component 101 according to various embodiments of the present invention.

```
"rules": {
  "ruleXXX": {
    "ruleActivationGroup": [
"OptFa1",
    "EqFa1"
    ],
    "ruleDescription":
    "active":
    "condition":
    "criteria": {
       "tier": {
         negate: true false,
         value:
       },
       "orderType": {
         negate: true false,
         values: [...]
       },
       "activityType": {
         negate: true false,
         value:
       },
       "currentState": {
         negate: true false,
         values: [...]
       }
    },
    "consequence": {
       "triggeredEvents": [ ],
       "nextState":
         "outcome":
    }
  }
}
```

As shown in FIG. 4, the automatic rule code generation system 20 may also comprise a DRL generator component 103. In a preferred embodiment, the DRL generator component 103 generates the rule code (e.g., "DRLs") for the configuration file 24 in the dRools language based on JSON metadata 102. The DRL generator component 103 reads the rule from the JSON metadata 102, validates and substitutes the values in defined DRL templates. Below are example DRL templates that can be used to generate the DRLs (dRools rules) 24 from the JSON metadata 102.

First is a base rule template. This is the base rule for all the tier rules. It checks the rule active/inactive condition and rule activation group, as it is applied on all the rules. Also, it validates if activity objects passed as input to the rule belong to the same input order.

```
_OrderActivityRule // check if the rule is enabled
    $order:Order( )
    $activity: Activity( $order.orderId memberOf orderIdList)
```

-continued

```
$orderStatus:OrderStatus(orderDetails.orderId==$order.ord
    erId)
```

Second is a base tier rules template. These are tier level rules which typecast the order to specific tier type. These rules extend the base rule and can be used to perform tier specific checks.

```
rule        _RouteRule extends _OrderActivityRule
when
            $route:Route( ) from $order / / col:K
then        end
rule        _TicketRule extends _OrderActivityRule
when
            $ticket:Ticket( ) from $order / / col:K
then        end
rule        _SliceRule extends _OrderActivityRule
when
            $slice:Slice( ) from $order / / col:K
then        end
rule        _SummaryRule extends _OrderActivityRule
when
            _$summary:Summary() from $order / / col:K
then        end
```

Third is a state transition rules template. In various embodiments, state transition rules extend base tier rules based on the tier value provided in the input. The state transition rules check the condition(s) and any additional criteria that are specific to the rule and generate responses.

```
query RuleXXXCondition(Order $order, Activity $activity)
   $tier: Tier( ) from $order
   Condition
end
rule RuleXXX extends _SummaryRule / _SliceRule / _TicketRule / _RouteRule
when
   Criteria 2 -- CurrentState -- should be one of the list
   AND
   Criteria 3 -- ActivityType -- single value--should match exactly
   AND
   Criteria 4 -- Theme --should be one of any in the list
   AND
   Criteria 5 -- Tier -- should match exactly(Type of Order)
   AND
   $o: Order( ) from $order
   $a: Activity( ) from $activity
   RuleXXXCondition($o, $a;)
then
   $orderStatus.outcome=updateOrderState($order, $orderStatus, <NEXT STATE>)
   $orderStatus.outcome = <OUTCOME_TYPE}
   $orderStatus.events = [<EVENTS>]
```

The DRLs in the configuration file 24 are stored in a memory of the servers 16 of the middle tier 14 and executed at runtime of the state transition engine 18. In that way, the state transition engine performs the state transitions as specified in the human-readable state transition file 22.

Such mechanisms for generating rule code for the state transition engine 18 provide many potential and realizable benefits for order management systems. For example, because the business rules for the state transition engine 18 are generated in this manner, the state transition engine 18 can be asset class-agnostic. That is, the state transitions for trades in one asset class (e.g., stocks) are typically different from the state transitions for trades in another asset class (e.g., bonds or derivatives, etc.). One prior art way to handle this is to have a separate state transition engine for each asset class. However, embodiments of the present invention provide the ability to specify state transitions for an asset class-agnostic to the order management system, since the "programmer" 15 can specify the state transition rules in the state transition file 22 for the different asset classes and the state transition engine 18 then execute the transition logic rules generated from the file 22 to handle the state transitions for the various trade orders it receives, across the various asset classes.

Embodiments of the present invention also provide the ability to specify state transition logic in meta-data configuration files 24 separate from the state machine itself (i.e., the state transition engine 18). It further supports the computation of order states as the order progresses through its life-cycle in an asset class agnostic order management system. Further, because of the human-readable state transition file 22, it provides the ability to determine the next valid order state efficiently. Still further, it can provide: a REST (REpresentational State Transfer)-based interface to the clients that need to compute order state transitions; the ability to specify transition rule parameters in a configuration file; the ability to specify an underlying data model used for state computation (i.e., in the data model sheet of the state transition file 22); the ability to specify rule criteria in a human readable expression format; and the ability to convert easy to read transition logic file into a meta-data configuration file 24 utilized by the state transition engine 18 at runtime. Other potential benefits realizable through embodiments of the present invention include the ability to mark a specific state transition rule as active or inactive (e.g., in the rules sheet of the state transition file 22) and the ability to generate user specified events after a state transition rule has been processed.

Figure 5:
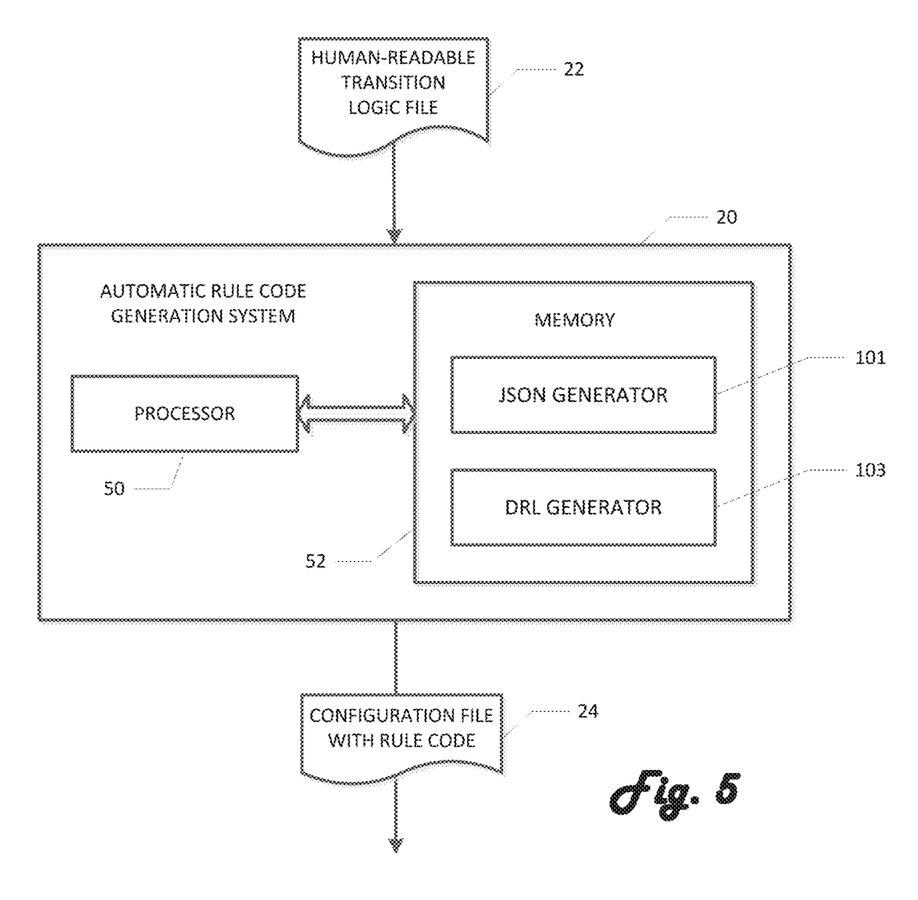
FIG. 5 is a block diagram of the automatic rule code generation system of the order management system of FIG. 1 according to various embodiments of the present invention.

FIG. 5 is a diagram of the automatic rule code generation system 20 according to various embodiments. As shown in FIG. 5, the rule code generation system 20 may comprise one or more processors 50 and one or more data storage or computer memory units 52. For simplicity, only one processor 50 and one memory unit 52 is shown in FIG. 5. The memory 52, which may comprise primary (memory directly accessible by the processor, such as RAM, processor registers and/or processor cache) and/or secondary (memory not directly accessible by the processor, such as ROM, flash, HDD, etc.) data storage, stores computer instruction or software to be executed by the processor 50. In particular, as shown in FIG. 5, the memory 52 may store the JSON generator software 101 and the DRL generator software 103. When the processor 50 executes the JSON generator software 101, the processor 50 generates the JSON metadata 102 from the state transition file 22 as described above. When the processor 50 executes the DRL generator software 103, the processor 50 generates the DRLs 24 from the JSON metadata 102 as described above. The automatic rule code generation system 20 could be implemented with a middle tier server 16 in various embodiments, or it could be implemented with a computer system (e.g., server, PC, etc.) that is remote from the middle tier 14 and in communication with the middle tier 14 via a data network (e.g., a LAN, WAN, Ethernet, Internet, etc.). The processor(s) 50 may include single or multicore CPUs, for example. The processors(s) 50 may also comprise heterogeneous multicore processor(s) that include, for example, CPU, GPU and/or DSP cores.

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to an order management system comprising a middle tier 14 and a computer-based automatic rule code generation system 20. The middle tier 14 comprises one or more servers 16 that execute a state transition engine 18 that manages rule-based state transitions of trade orders for financial products from one state to a next state in progressions of the trade orders. The computer-based automatic rule code generation system 20 is configured, through programming, to: (i) receive a human-readable state transition file 22 that specifies one or more state transition rules and a corresponding condition for each of the one or more state transition rules; and (ii) generate, at compile time, a configuration file 24 that comprises rule code for the one or more state transition rules from the state transition file 22. The state transition engine 18 runs the rule code in the configuration file 24 at runtime to manage the state transitions for the trade orders.

In various implementations, the automatic rule code generation system is configured, through programming, to generate the rule code by generating metadata (e.g., JSON metadata) 102 from the state transition file 22 and generating the rule code (e.g., Java rule code) 24 from the JSON metadata 102. In that connection, the state transition engine 18 may comprise a Java-based rules engine. The human-readable state transition file 22 may comprise a spreadsheet, for example. The spreadsheet may comprise a rules sheet that specifies, by row, the condition for each of the one or more state transition rules in the transition logic file. The automatic rule code generation system may generate, row-by-row, rule code for each state transition rule in the rules sheet.

In various implementations, the one or more state transition rules comprises a rule with an event ID type trigger that, upon the state transition engine executing the rule, causes the state transition engine to trigger an event type corresponding to the event ID type trigger. For example, the event type that is triggered may be the sending of a notification to a calling system that places a call to the middle tier.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, although embodiments above were described in the context of an order management system using dRools with JSON metadata, the present invention is not so limited unless otherwise indicated, and can therefore be applied to other types of state transition systems that use other types of state transition engines.

Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An order management system that executes trade orders for financial products, the order management system comprising:
   a middle tier that comprises one or more servers, where the one or more servers of the middle tier execute a state transition engine that comprises a Java-based rules engine that applies state transition rules to the trade orders received by the order management system that manages a progression of each received trade order from one state to a next state in progressions of the trade orders along a trade order life cycle, where the trade orders comprise trade orders for financial securities, and where the trade order life cycle comprises a plurality of trade states, where the plurality of trade states comprise at least an open trade state and a second trade state selected from the group consisting of filled, partially filled, canceled, confirmed, rejected and booked;
   at least one back-end system in communication with the middle tier; and
   a computer-based automatic rule code generation system that is configured, through programming, to:
   receive a human-readable file that specifies the state transition rules that are applied by the rules engine of the state transition engine, where human-readable file comprises a spreadsheet and where each state transition rule in the human-readable file includes parameters specified in the human-readable file, where the parameters for each state transition rule comprise a current state for the trade order to which the transition rule is applied, a condition for the state transition rule, and a next state to which the trade order progresses if the condition for the state transition rule is satisfied; and
   generate, at compile time, a configuration file from the human-readable file, where the configuration file comprises Java rule code, that is executed by the state transition engine, for the state transition engine to apply the state transition rules in the human-readable file, where:

the automatic rule code generation system is configured, through programming, to generate the rule code by:

generating JavaScript Object Notation ("JSON") metadata from the human-readable file; and substituting values in the JSON metadata into a defined Drools Rule Language ("DR L") template; and where the state transition engine executes the rule code in the configuration file at runtime that manages the state transitions for the received trade orders, where when one of the state transition rules in the human-readable file is applied by the state transition engine for a trade order, the trade order progresses from the current state to the next state upon a determination that the condition for the state transition rule is satisfied and the life cycle for a trade order terminates when the trade order progresses to a final trade state, where the state transition engine is determines whether the condition for the state transition rule is satisfied based on a call to the at least one back-end system.

2. The order management system of claim 1, where:
the spreadsheet comprises a rules sheet that specifies the condition for each state transition rule in the human-readable file; and
the automatic rule code generation system generates rule code for each state transition rule in the rules sheet.

3. The order management system of claim 2, where:
the spreadsheet comprises a rules sheet that specifies, by row, the condition for each state transition rule in the human-readable file; and
the automatic rule code generation system generates, row-by-row from the rules sheet, rule code for each state transition rule in the rules sheet.

4. The order management system of claim 1, where the state transition rules comprise a rule with an event ID type trigger that, upon the state transition engine executing the rule code for the rule, causes the state transition engine to trigger an event type corresponding to the event ID type trigger.

5. The order management system of claim 4, where the event type that is triggered is sending a notification to a calling system that is in communication with the state transition engine.

6. A method of configuring a computer-implemented order management system that executes trade orders for financial products, where the order management system comprises a middle tier that comprises one or more servers, where the one or more servers of the middle tier execute a state transition engine that comprises a Java-based rules engine that applies state transition rules to the trade orders received by the order management system that manages a progression of each received trade order from one state to a next state in progressions of the trade orders along a trade order life cycle, where the trade orders are orders containing trades for financial securities, and where the trade order life cycle comprises a plurality of trade states, where the plurality of trade states comprise at least an open trade state and a second trade state selected from the group consisting of filled, partially filled, canceled, confirmed, rejected and booked, the method comprising:

receiving, by a computer-based automatic rule code generation system, a human-readable file that specifies the state transition rules that are applied by the state transition engine, where the human-readable file comprises a spreadsheet and where each state transition rule in the human-readable file includes parameters specified in the human-readable file, for the parameters for each state transition rule comprise a current state for the trade order to which the transition rule is applied, a corresponding condition for the state transition rule, and a next state to which the trade order progresses if the condition for the state transition rule is satisfied;

generating, by the computer-based automatic rule code generation system, at compile time, a configuration file that comprises Java rule code for the state transition rules from the human-readable file, where the Java rule code is executed by the state transition engine, where generating the rule code comprises:

generating, by the computer-based automatic rule code generation system, JavaScript Object Notation ("JSON") metadata from the human-readable file; and substituting, by the computer-based automatic rule code generation system, values in the JSON metadata into a defined Drools Rule Language ("DRL") template; and executing, at runtime, by the state transition engine of the middle tier, the rule code in the configuration file that manages the state transitions for the trade orders, where when one of the state transition rules in the human-readable file is applied by the state transition engine for a trade order, the trade order progresses from the current state to the next state upon a determination that the condition for the state transition rule is satisfied and the life cycle for a trade order terminates when the trade order progresses to a final trade state, and where executing the rule code comprises placing, by the state transition engine, a call to a back-end system that is in communication middle tier to determine whether the condition for the state transition rule is satisfied.

7. The method of claim 6, where:
the spreadsheet comprises a rules sheet that specifies the condition for each of the one or more state transition rules in the human-readable file; and
generating the rule code comprises generating, by the computer-based automatic rule code generation system, rule code for each state transition rule in the rules sheet.

8. The method of claim 6, where:
the spreadsheet comprises a rules sheet that specifies, by row, the condition for each of the one or more state transition rules in the file; and
generating the rule code comprises generating, by the computer-based automatic rule code generation system, row-by-row from the rules sheet, rule code for each state transition rule in the rules sheet.

9. The method of claim 6, where the state transition rules comprise a rule with an event ID type trigger that, upon the state transition engine executing the rule code for the rule, causes the state transition engine to trigger an event type corresponding to the event ID type trigger.

10. The method of claim 9, where the event type that is triggered is sending a notification to a calling system that places a call to the middle tier.

* * * * *